United States Patent [19]

Wharton

[11] Patent Number: 4,786,224

[45] Date of Patent: Nov. 22, 1988

[54] WHEEL LUG NUT COVER

[75] Inventor: Donald J. Wharton, Mishawaka, Ind.

[73] Assignee: Maron Products, Inc., Mishawaka, Ind.

[21] Appl. No.: 161,309

[22] Filed: Feb. 22, 1988

Related U.S. Application Data

[63] Continuation of Ser. No. 855,885, Apr. 24, 1986, abandoned.

[51] Int. Cl.⁴ ............................................. F16B 31/00
[52] U.S. Cl. ............................................ 411/1; 411/8; 411/326; 411/371; 411/911; 70/232
[58] Field of Search ................... 411/1, 2, 8, 114, 115, 411/131, 141, 145, 146, 326, 327, 328, 329, 330, 331, 371, 372, 373, 374, 375, 376, 377, 397, 427, 910, 429; 292/307 B; 70/229, 230, 231, 232, 259, 260; 301/37 AT

[56] References Cited

U.S. PATENT DOCUMENTS

| | | | |
|---|---|---|---|
| 539,627 | 5/1895 | Lines | 411/375 |
| 907,473 | 12/1908 | DeTray | 411/145 |
| 1,274,990 | 8/1918 | Charest | 411/328 |
| 2,033,371 | 3/1936 | Benaggio . | |
| 2,103,743 | 12/1937 | Doty . | |
| 2,151,485 | 3/1939 | Pawsat . | |
| 2,228,738 | 1/1941 | Thomson . | |
| 2,316,695 | 4/1943 | Jaffa . | |
| 2,345,949 | 4/1944 | Robbins . | |
| 2,523,652 | 9/1950 | Dowd et al. | 411/141 X |
| 2,747,940 | 5/1956 | Tracy | 301/37 AT |
| 2,978,896 | 4/1961 | Saccone . | |
| 3,016,248 | 1/1962 | Lindberg | 411/145 X |
| 3,241,427 | 3/1966 | Bosler . | |
| 3,440,590 | 4/1969 | Post . | |
| 3,492,841 | 2/1970 | Ipri . | |
| 3,512,447 | 5/1970 | Vaughn . | |
| 3,540,245 | 11/1970 | Pope . | |
| 3,548,704 | 12/1970 | Kutryk . | |
| 3,561,317 | 2/1971 | Rowell . | |
| 3,742,583 | 7/1973 | Devlin et al. . | |
| 3,854,372 | 12/1974 | Gutshall . | |
| 3,865,007 | 2/1975 | Stanback . | |
| 3,978,761 | 9/1976 | Sosinski . | |
| 4,037,515 | 7/1977 | Kesselman . | |
| 4,067,621 | 1/1978 | Reppert | 301/37 AT |
| 4,203,382 | 5/1980 | Mullen . | |
| 4,302,137 | 11/1981 | Hart . | |
| 4,324,516 | 4/1982 | Sain et al. | 411/5 |
| 4,374,509 | 2/1983 | Kawabata et al. | 292/307 B X |
| 4,493,597 | 1/1985 | Rolf | 411/326 |
| 4,521,146 | 6/1985 | Wharton . | |
| 4,659,273 | 4/1987 | Dudley | 70/232 X |

FOREIGN PATENT DOCUMENTS

| | | | |
|---|---|---|---|
| 1209902 | 1/1966 | Fed. Rep. of Germany | 411/429 |
| 1198922 | 7/1970 | United Kingdom . | |
| 1478992 | 7/1977 | United Kingdom . | |

*Primary Examiner*—Gary L. Smith
*Assistant Examiner*—Rodney M. Lindsey
*Attorney, Agent, or Firm*—Barnes & Thornburg

[57] ABSTRACT

A lug nut cover is provided having a breakage shroud for restricting access to the lug nut and a retaining cap for securing the shroud to the lug. The shroud includes an internal ledge having ratchet teeth thereon. The cap includes an exterior flange having pawls thereon. When the cap is threaded onto the lug, the ledge engages the flange at a predetermined position to stop forward threading. From this predetermined position, the pawl/ratchet arrangement prevents reverse threading.

14 Claims, 3 Drawing Sheets

WHEEL LUG NUT COVER

This is a continuation of application Ser. No. 06/855,885, filed Apr. 24, 1986, that prior application now abandoned.

BACKGROUND AND SUMMARY OF THE INVENTION

The present invention relates generally to lug nut and wheel lug covers. More particularly, this invention relates to tamper resistant indicators of unauthorized lug nut removal.

This invention is an improvement upon the invention shown in U.S. Pat. No. 4,521,146, assigned to the same assignee as the present invention. The disclosure and specification of this prior patent are specifically incorporated herein by reference.

An object of the present invention is the provision of an improved lug nut cover.

Another object is to provide a lug nut cover having means for visually demonstrating successful and unsuccessful tampering attempts.

Still other object is the provision of an improved lug nut cover with restricted access to the retaining cap.

A further object is to provide a nut cover having means for positively preventing unthreading of the retaining cap.

These and other objects of the present invention are attained by the provision of a lug nut cover having a rigid plastic shroud which fits over a lug nut and threaded lug to restrict access to the lug nut. A retaining cap fits through a central aperture at one end of the shroud and is threaded onto the wheel lug. This cap secures the shield in place over the lug nut via a circumferential flange which seats on a shoulder or ledge in the central aperture. The cap includes a square socket opening extending from its exposed, outer face by which the cap can be threaded onto the lug with an appropriate tool. The inner wall of the shroud includes a plurality of thickened portions or legs. These legs serve to engage the planar sides of the lug t and prevent rotation of the shield relative to the lug nut. The shoulder of the central aperture and the cap flange include a cooperating pawl/ratchet arrangement which prevents reverse relative rotation between the cap and the lug once the cap is fully threaded into a predetermined locking position.

This invention is intended to provide an inexpensive, visual indication of whether or not a vehicle wheel has been removed since, once installed, the cover cannot be removed from the lug without breaking the cover. Both the shroud and the cap can be formed from breakable plastic materials and marked with distinctive colors or codes. The cap socket is not frangible to be broken off during installation but, rather, is left intact to restrict access to the cap and visually demonstrate tampering attempts. Thin walled portions of the socket are destructible in response to unauthorized reverse threading and thereby cause the socket walls to flex away from and out of engagement with a tool. Projecting portions of the socket walls restrict access to the cap face.

Once threaded down onto the shroud ledge, the cap cannot be unscrewed without destroying the non-reversible pawl/ratchet arrangement. Also, the lug nut is substantially covered and cannot be engaged by a tool and removed without destroying the shroud. The shroud legs and/or shroud material are formed so as to not be strong enough to permit the lug nut to be unthreaded by rotation of the shroud itself. Further, interlocking of the legs and the lug nut prevents the cap from being unthreaded by rotation of the shroud. Thus, the present invention provides tamper indications and restrictions in both the shroud and the cap.

These and other objects, advantages and novel features of the present invention will become readily apparent upon consideration of the following detailed description in conjunction with the drawings.

DETAILED DESCRIPTION OF PREFERRED EMBODIMENTS

Figure 1:
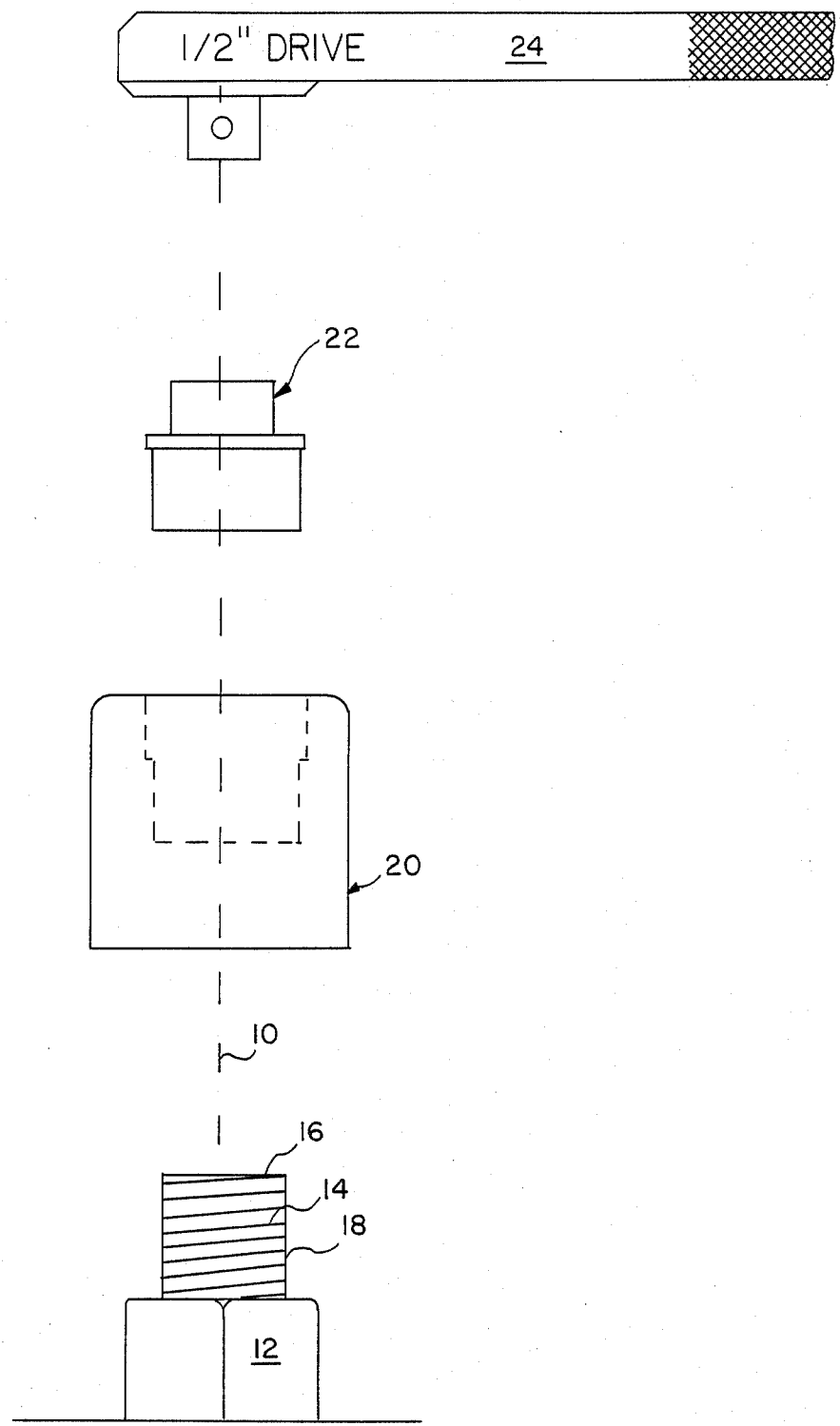
FIG. 1 shows an exploded side view of a preferred embodiment of the present invention.
Figure 4:
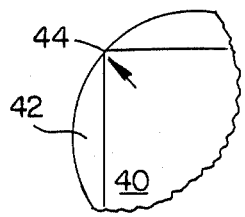
FIG. 4 shows an enlarged top end view of a thin-walled portion of the retaining cap of FIG. 1.

FIG. 1, which illustrates a preferred embodiment of the present invention, shows an exploded side view along longitudinal axis 10. Lug nut 12 is threadedly secured to threads 14 of lug 16. Nut 12 can, for example, be employed to secure a vehicle wheel (not shown) to lug 16 of an axle-hub assembly (not shown). Alternatively, lug 16 can be a threaded bolt secured to some other device. Lug 16 can be of any desired dimensions as long as at least a portion 18 of lug 16 extends above nut 12 when that nut is secured in place.

The cover of the present invention includes shroud 20 and retaining cap 22 and can, for example, be secured in place over lug 16 and nut 12 by a conventional socket wrench 24. Once installed, shroud 20 covers lug 16 and nut 12 so as to prevent any tool from directly engaging nut 12 to remove it from lug 16. Cap 22 is inserted within shroud 20 and is threaded onto lug 16 to prevent shroud 20 from being removed from nut 12.

Figure 2:
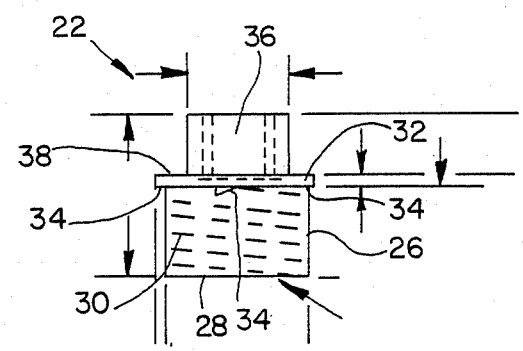
FIG. 2 shows a side view of the retaining cap of FIG. 1.
Figure 7:
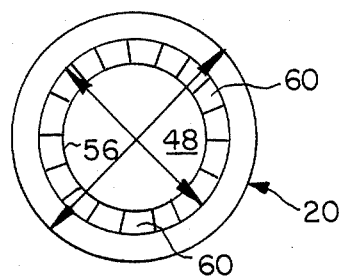
FIG. 7 shows a top end view of the shroud of FIG. 1.
Figure 6:
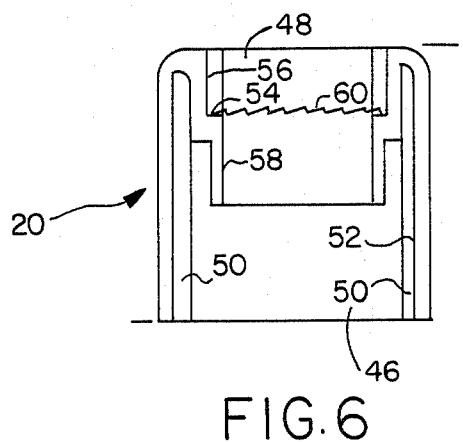
FIG. 6 shows a side, sectional view of the shroud of FIG. 1 taken along line 6—6 of FIG. 5.
Figure 5:
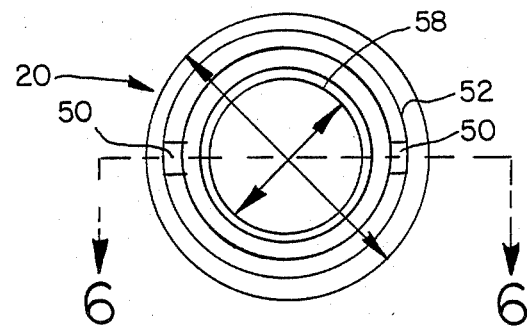
FIG. 5 shows a bottom end view of the shroud of FIG. 1.

As shown in FIG. 2, cap 22 is, for example, generally cylindrical and includes a base portion 26 having a downwardly opening end 28 with a threaded interior surface 30. The thread spacing and cap opening dimensions are preferably formed so as to threadedly receive portion 18 of lug 16 extending from nut 12. Cap 22 also includes a flange 32 which extends radially from the circumference of base 26. A plurality of spaced-apart pawls 34 are provided on the downward side of flange 32. Socket portion 36 is formed to extend upwardly from surface 38 of flange 32. Surface 38 is typically exposed to the exterior environment when cap 22 is fully secured within shroud 20.

Figure 3:
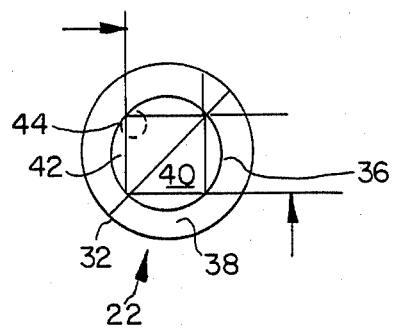
FIG. 3 shows a top end view of the retaining cap of FIG. 1.

As shown in FIG. 3, socket portion 36 is, for example, formed with recess 40 to receive a square socket tool portion. A portion of recess 40 can extend slightly above or below surface 38. Socket 36 includes thickened walls 42 and thin walled regions 44. Unlike prior devices, thin walled regions 44 are not longitudinally slit or intended to be frangible upon threaded insertion of cap 22 into shroud 20. Instead, socket 36 remains intact when cap 22 is secured in place. However, if a socket tool is used in an attempt to unthread cap 22, the thin walled portions are torn at the resistance of the pawl/ratchet arrangement described below and, thus, thickened walls 42 flex away from the socket tool portion inserted within recess 40.

Shroud 20 includes a first, lower opening 46 for receiving lug 16 and nut 12 and a second, upper opening 48 for receiving cap 22. Openings 46 and 48 are preferably longitudinally aligned along axis 10 and centrally disposed. Shroud 20 is preferably substantially cylindrical, although alternative embodiments can include various degrees of taper toward its lower opening. At least one longitudinally extending leg or thickened portion 50 is integrally formed on interior surface 52 of shroud 20. This leg is adapted to engage a planar surface of nut 12 and prevent rotation of shroud 20 relative to that nut.

Shroud 20 also includes a ledge 54 spaced downwardly from opening 48 and extending radially inwardly from surface 56. An internal sleeve 58 is provided beneath ledge 54 which forms a cylindrical opening toward the lower end of shroud 20. The interior diameter of sleeve 58 is at least as wide as the exterior diameter of base 26 and serves to locate and guide cap 22 into threaded engagement with lug 16. The upper surface of ledge 54 is formed with a preferably continuous series of inclined ratchet teeth 60 which are adapted to be matingly engageable with pawls 34. The direction of incline of teeth 60 and pawls 34 is such as to oppose upward or reverse threading of cap 22. In alternative embodiments, pawls 34 can be formed on ledge 54 and ratchet teeth 60 formed on flange 32.

Downward or forward threading of cap 22 into shroud 20 and onto lug 16 is not opposed by this ratchet/pawl arrangement, although when ledge 54 comes into full engagement with the lower surface of flange 32, the ledge acts as a stop against further forward threading of cap 22 beyond that predetermined position. In preferred embodiments of the present invention, the lower end of sleeve 58 coincides with the lower end of base 26 and rests on the upper surface of nut 12 at this predetermined cap position.

To mount the cover of the present invention over a lug nut/wheel lug assembly, shroud 20 is first disposed over lug 16 and nut 12, with legs 50 and sleeve 58 centrally locating lug 16 within opening 48. Cap 22 is then inserted within that opening and threaded down onto lug 16 to the predetermined stop position. At this point, shroud 20 is locked over nut 12. Socket 36 need not be completely received within opening 48 but the exposed surface of flange 32 should be recessed within that opening to restrict access for tampering or unauthorized removal. The upwardly extending portions of socket 36 also serve to restrict such access to flange 32.

It has been found to be particularly advantageous to form shroud 20 from brittle materials such as crystal styrene plastic. Cap 22 can be formed from high impact ABS plastic materials. Unique colors or coding can be employed to provide easy identification. The thickness and hardness of shroud 20 are preferably selected such that the shroud will crack and shatter if a tool engages its exterior surface in an attempt to rotate the shroud to unthread nut 12 and/or cap 22. Use of a socket tool to strip the pawl/ratchet locking arrangement to unthread cap 22 will cause visible deformation of the walls socket 36 and will be rendered more difficult by the flexing of the thickened wall portions away from the tool. The heightened ability of the present invention to detect even attempted lug nut removal is believed to provide increased deterrence to wheel theft.

Although the present invention has been described in detail, the same is by way of illustration and example only and is not to be taken as limitation. The spirit and scope of the present invention are to be limited only by the terms of the appended claims.

What is claimed is:

1. A lug nut cover, for use with a wheel lug having external threads and a lug nut threaded thereon with a portion of said external threads extending above said lug nut, to detect removal of said lug nut from said wheel lug and detect tampering with said cover, comprising:
   a breakable shroud dimensioned to have a width and a length sufficiently larger than said lug nut so as to enable said shroud to surround said lug nut and said wheel lug to prevent access to said lug nut for removal of said lug nut from said wheel lug;
   an inner ledge projecting from said shroud;
   a cap member having an internally threaded portion over a length thereof for securing said cap to said external threads of said wheel lug above said lug nut, said length being dimensioned so as to enable said cap to be fully threaded onto said portion of said external threads extending above said lug nut;
   a flange projected from said cap which is engagable with said inner ledge when said cap is fully threaded to said wheel lug, the engagement of said flange and said ledge serving to retain said shroud about said lug nut and said wheel lug; and
   a non-reversible pawl/ratchet arrangement on the engaging portions of said ledge and said flange for preventing relative rotation between said cap and said shroud as a result of reverse threading of said cap once said cap is fully threaded onto said wheel lug.

2. The lug nut cover according to claim 1 wherein said cap includes a socket portion extending above said internally threaded portion for receiving a tool for threading said cap onto said wheel lug.

3. The lug nut cover according to claim 2 wherein said socket portion comprises a tool receiving cavity defined by projecting walls separated by thin walled portions which render said socket portion destructable upon reverse threading of said cap by a tool received within said socket portion.

4. The lug nut cover according to claim 1 wherein said shroud includes interior means engageable with said lug nut to prevent rotation of said shroud about said lug nut.

5. The lug nut cover according to claim 4 wherein said interior means includes a plurality of leg portions extending along the longitudinal axis of said shroud.

6. The lug nut cover according to claim 1 wherein said shroud is formed from crystal styrene materials and said cap is formed from high impact, ABS plastic materials.

7. A cover for a nut and bolt arrangement wherein an exposed portion of said bolt projects from said nut, including means for detecting cover removal and tampering therewith, comprising:
   a shroud, formed from breakable materials, having a generally cylindrical configuration with first and second end openings and extending longitudinally a greater length than the exposed longitudinal length of said nut and bolt arrangement such that said shroud is dimensioned to receive said nut and bolt arrangement therein through said first end opening and prevent access to said nut for removal of said nut from said bolt;

a ledge projecting from an interior surface of said shroud and recessed from both said first end opening and said second end opening;

a cap means, for retaining said shroud about said nut and bolt arrangement once said nut and bolt arrangement is inserted within said shroud, including a threaded portion for engagement with said exposed portion of said bolt, said cap being adapted for insertion within said shroud through said second end opening;

a flange projecting from said cap which is dimensioned for engagement with said ledge to restrain further insertion of said cap into said shroud beyond a predetermined threaded portion of said cap with respect to said exposed portion of said bolt; and a non-reversible pawl/ratchet arrangement formed on said ledge and said flange which restricts relative rotation between said cap and said shroud as a result of attempted reverse threading of said cap to withdraw said cap from said predetermined threaded position.

8. The cover according to claim 7 wherein an end surface of said flange is exposed through and recessed from said second end opening.

9. The cover according to claim 8 wherein said end surface of said flange includes a socket portion projection therefrom which is adapted to receive a tool for threading said cap onto said bolt.

10. The cover according to claim 9 wherein said socket portion comprises a tool receiving cavity defined by thin-walled regions separating projecting walls, said thin-walled regions being destructible to cause said socket portion to flex away from said tool when said tool is employed to remove said cap from said predetermined position.

11. A lug nut cover for use with a wheel lug having a lug nut threaded thereon wherein an exposed portion of said wheel lug extends from said lug nut, said cover providing means for detecting removal of said lug nut and tampering with said cover to attempt removal of said lug nut, comprising:

a longitudinally extending shroud formed from breakable materials, having first and second openings at opposing longitudinal ends, said shroud being dimensioned to receive therein said lug nut and said exposed portion of said wheel lug through said first opening, and the longitudinal length of said shroud with respect to said nut and bolt arrangement being sufficient to restrict access of tools to engage and rotate said lug nut when said lug nut is received within said shroud;

said shroud further including an interior surface having an inwardly projecting shoulder thereon, said shoulder being longitudinally recessed from said first opening and said second opening;

a cap means for retaining said shroud about said wheel lug and restricting access to said lug nut through said second opening, said cap means including a threaded portion for engagement with said exposed portion of said wheel lug, said cap further being dimensioned for insertion within said shroud through said second opening;

said cap means including a projection dimensioned for engagement with said shoulder to restrain further threaded engagement of said cap means onto said wheel lug beyond a predetermined position; and a non-reversible pawl/ratchet arrangement formed on said shoulder and on said projection which restricts relative motion between said shroud and said cap means as a result of attempted reverse threading of said cap means to withdraw said cap means from said predetermined position.

12. The lug nut cover according to claim 11 wherein said cap means includes an outer face having longitudinally extending wall means for forming a tool receiving cavity as a socket portion for a tool to thread said cap means onto said wheel lug, said wall means being dimensioned to restrict access to said end face after said cap means is threaded to said predetermined position.

13. A lug nut cover according to claim 12 wherein said wall means are separated into distinct segments by thin wall members which are destructable upon reverse threading of said cap means by a tool in said socket to cause said segments to flex outwardly.

14. A cover for a nut and bolt arrangement wherein said nut is threaded onto said bolt and an exposed portion of said bolt is provided over which said nut has been threaded, comprising:

a shroud means for restricting access to said nut, said shroud means having a width larger than the width of said nut and a length at least as large as the length of said nut;

said shroud means having a first opening for receiving said nut and bolt arrangement therein and a second opening for providing access to said exposed portion of said bolt when said nut and bolt arrangement is received in said first opening;

said shroud means having an inwardly projecting ledge;

a cap means for retaining said shroud means about said nut and bolt arrangement, said cap means being dimensioned so as to be rotatably received within said second opening;

said cap means including a threaded portion for securing said cap to said exposed portion of said bolt;

said cap means including a flange projecting therefrom to engage said ledge when said cap means is fully threaded onto said exposed portion of said bolt;

a non-reversible pawl/ratchet arrangement on said cap means and said shroud means for preventing relative rotation between said cap means and said shroud means as a result of attempted reverse threading of said cap means once said cap means is fully threaded onto said exposed portion of said bolt;

said shroud means including interior portions for preventing relative rotation between said nut and said shroud means when said nut and bolt arrangement is received within said first opening; and said shroud means being formed and dimensioned from materials that are broken if sufficient force is applied to said shroud means to unthread said nut over said exposed portion of said bolt.

* * * * *

UNITED STATES PATENT AND TRADEMARK OFFICE
CERTIFICATE OF CORRECTION

PATENT NO.  : 4,786,224

DATED       : November 22, 1988

INVENTOR(S) : Donald J. Wharton

It is certified that error appears in the above-identified patent and that said Letters Patent is hereby corrected as shown below:

In column 1, line 42, please delete "t" and insert therefor --nut--.

In Claim 9, at line 2 and 3, please delete "projection" and insert therefor --projecting--.

Signed and Sealed this

Twenty-eighth Day of March, 1989

Attest:

DONALD J. QUIGG

Attesting Officer

Commissioner of Patents and Trademarks